INVENTOR.
ELMER D. WEERTS
BY
Carlsen & Hoyle
ATTORNEYS

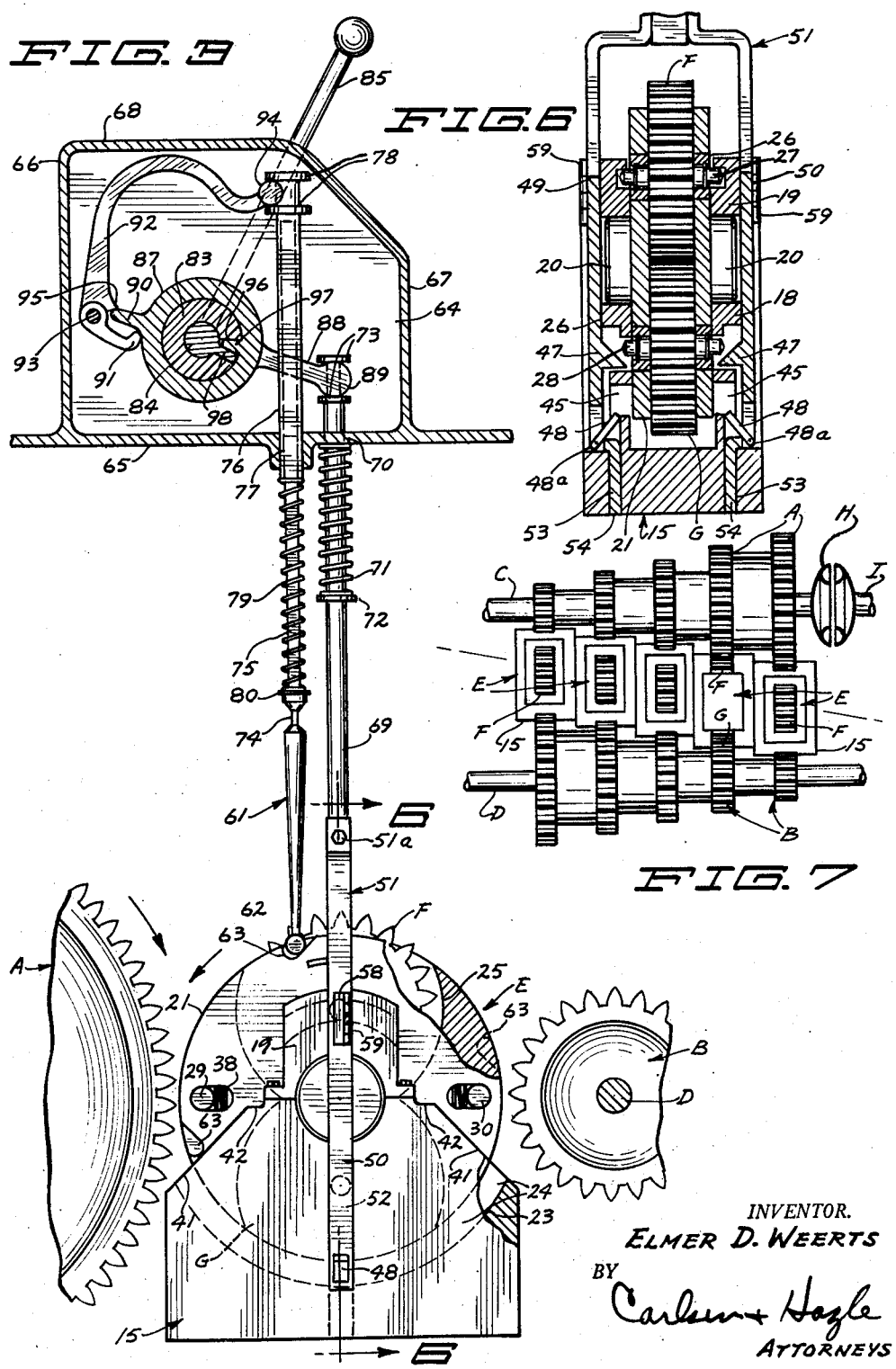

Jan. 21, 1958 — E. D. WEERTS — 2,820,371
CHANGE SPEED TRANSMISSION
Filed Dec. 24, 1956 — 4 Sheets-Sheet 3
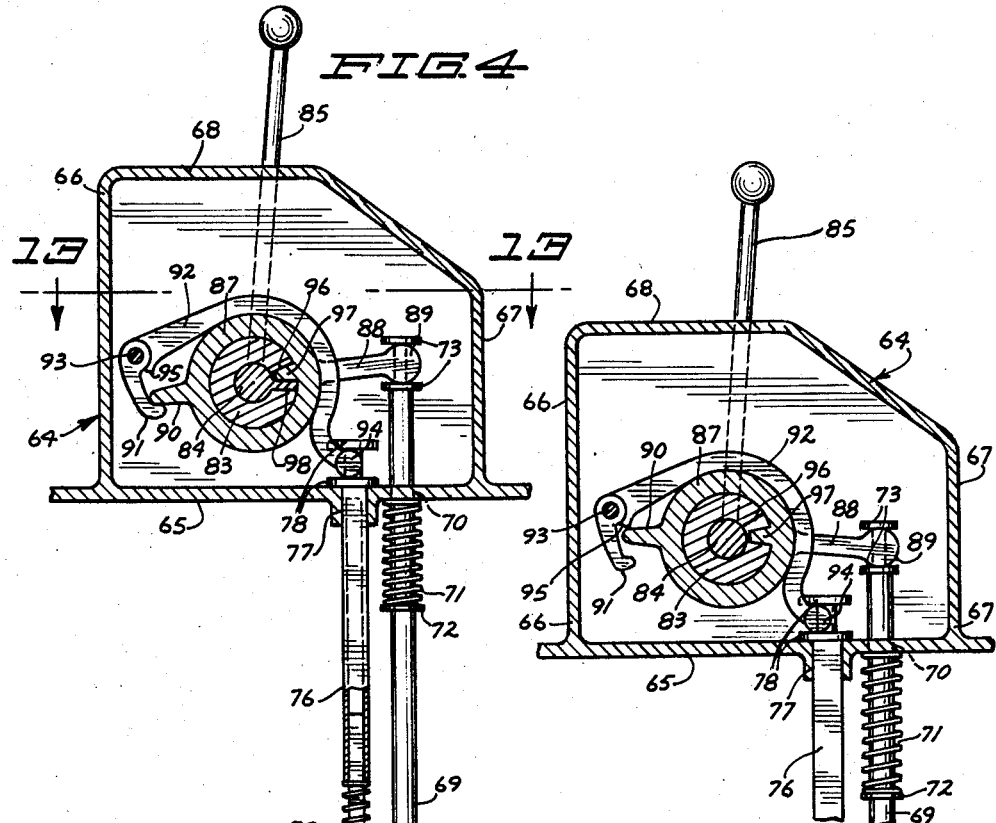
FIG. 4
FIG. 5
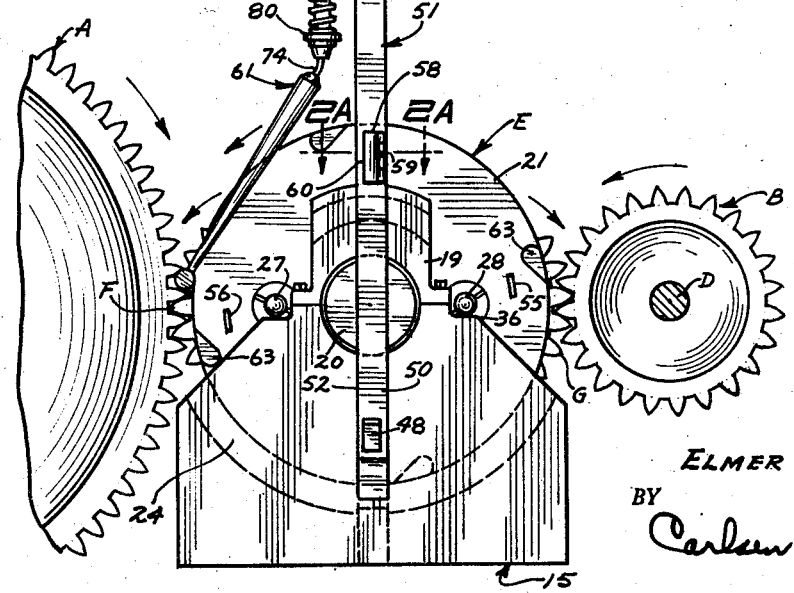
INVENTOR.
ELMER D. WEERTS
BY
Carlsen & Hogle
ATTORNEYS Jan. 21, 1958     E. D. WEERTS     2,820,371
CHANGE SPEED TRANSMISSION
Filed Dec. 24, 1956     4 Sheets-Sheet 4
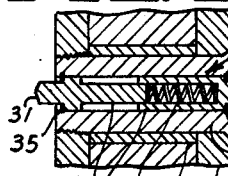
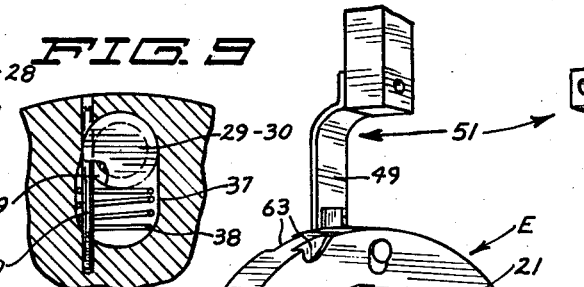
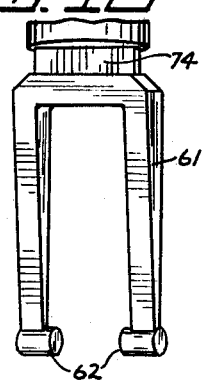
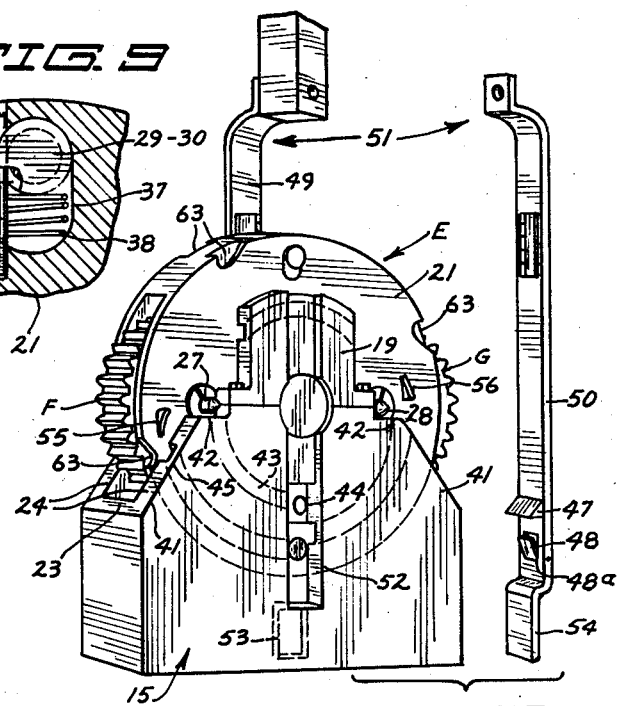
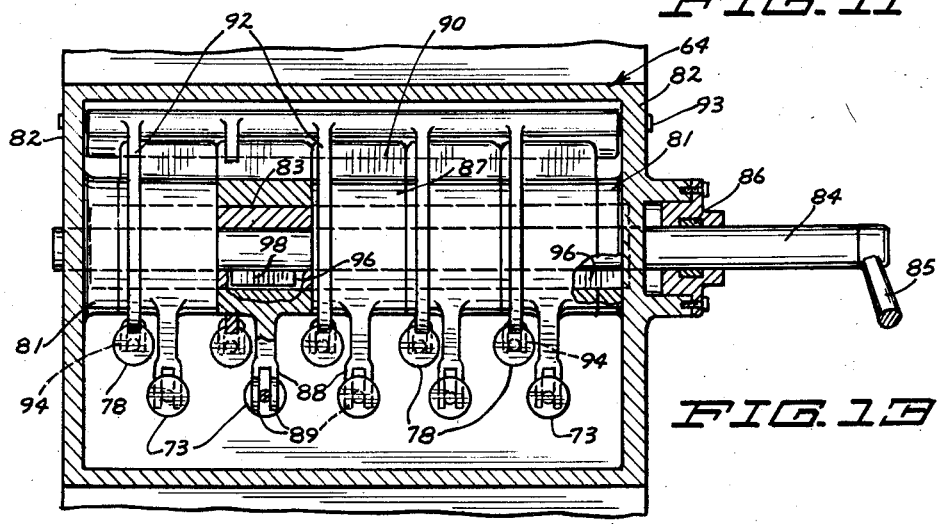
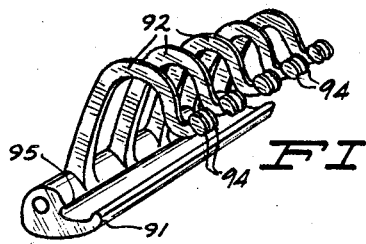
INVENTOR.
ELMER D. WEERTS
BY
Carlsen + Hazle
ATTORNEYS

┌─────────────────────────────────────────────────────────┐

United States Patent Office 2,820,371
Patented Jan. 21, 1958

---

2,820,371

CHANGE SPEED TRANSMISSION

Elmer D. Weerts, Bancroft, S. Dak.

Application December 24, 1956, Serial No. 630,366

7 Claims. (Cl. 74—349)

My invention relates generally to improvements in change speed transmissions for transmitting torque from one rotating element to another, for example propulsion power from the engine to the ground engaging or traction members of tractors and various other self-propelled machines as used on the farm, in industry, for highway building, maintenance and travel, and for similar purposes.

Considering the farm tractor as a primary example it has long been the practice to provide the same with a governor controlled, constant speed engine and with a change speed transmission through which propulsion forces are transmitted to the traction wheels at various speeds relative to that of the engine, as determined by the adjustment of said transmission. It has, however, been necessary to bring the tractor to a halt in order to shift the transmission from one speed range to another and in many kinds of work to which such tractors are put this has been a distinct disadvantage. For example these tractors are used in many instances to pull a plow, combine or other implement and if operating conditions indicate the desirability of a change of gears then the travel of this equipment must be halted while the gears are shifted and then must be started up again under load. The disadvantages of such operation are so obvious as to require no explanation herein. In fact recent improvements have been made in tractor transmissions embodying a two-speed drive between the engine and transmission, shiftable between such speeds while the tractor is in motion, in the effort to solve this problem and permit at least limited variations in travel speed on the go, so to speak.

It is the primary object of my invention to provide an improved change speed transmission suitable for use in tractors, self-propelled implements and other vehicles which will permit changes in travel speed in all speed ranges of the transmission with the vehicle in motion and without operation of the usual clutch with which such equipment is customarily supplied. Another object is to provide a transmission in which the gear ranges are selected by rolling intermediate gears into and out of mesh with the driving and driven gears, under control of a suitable speed selector mechanism, by contrast with the usual axially shiftable change speed gears, so that once a speed range is selected the change takes place automatically and with no clashing of gears and no declutching required. Still another object is to provide an improved change speed transmission of the foregoing desirable characteristics which is simple and durable in construction, convenient in operation and adaptable to all kinds of self-propelled vehicles and equipment.

I do not limit myself to the use of my change speed mechanism only for transmitting propulsion power to vehicle wheels and it may be used wherever it is desired to transmit torque from one rotating element to another, at varying speeds, without departing from the scope of my invention.

These and other more detailed and specific objects will be disclosed in the course of the following specification, reference being had to the accompanying drawings, in which—

Fig. 3 is a view similar to Fig. 1 except that the speed changing unit is shown in end elevation and also this view illustrates the speed selector mechanism by which such unit is controlled, portions of the latter being illustrated in section.

Fig. 4 is a view similar to Fig. 3 but illustrating the speed changing unit in its in mesh condition.

Fig. 5 is a sectional detail view like the upper portion of Fig. 4 but illustrating a condition of the speed selector mechanism intermediate the positions of Figs. 3 and 4.

Fig. 6 is a vertical sectional view through the speed changing unit as taken substantially along the line 6—6 in Fig. 3.

Fig. 7 is a plan view on a reduced scale showing the change speed gear clusters on parallel driving and driven shafts and illustrating the manner in which one of my speed changing units is arranged between each set of matching gears on said clusters.

Figs. 8 and 9 are enlarged sectional detail views through the locking pins by which the gear carrier of my speed changing unit is located in its adjusted positions.

Fig. 10 is a detail perspective view of the shifter fork by which the said gear carrier is moved from one position to another.

Fig. 11 is an exploded perspective view of one of the speed changing units and the asociated actuating locking fork.

Fig. 12 is a perspective detail view of the lever unit for operating the shifter fork of Fig. 10.

Fig. 13 is a horizontal plan view and section, taken along the line 13—13 in Fig. 4, illustrating the speed selector mechanism.

Figure 1:
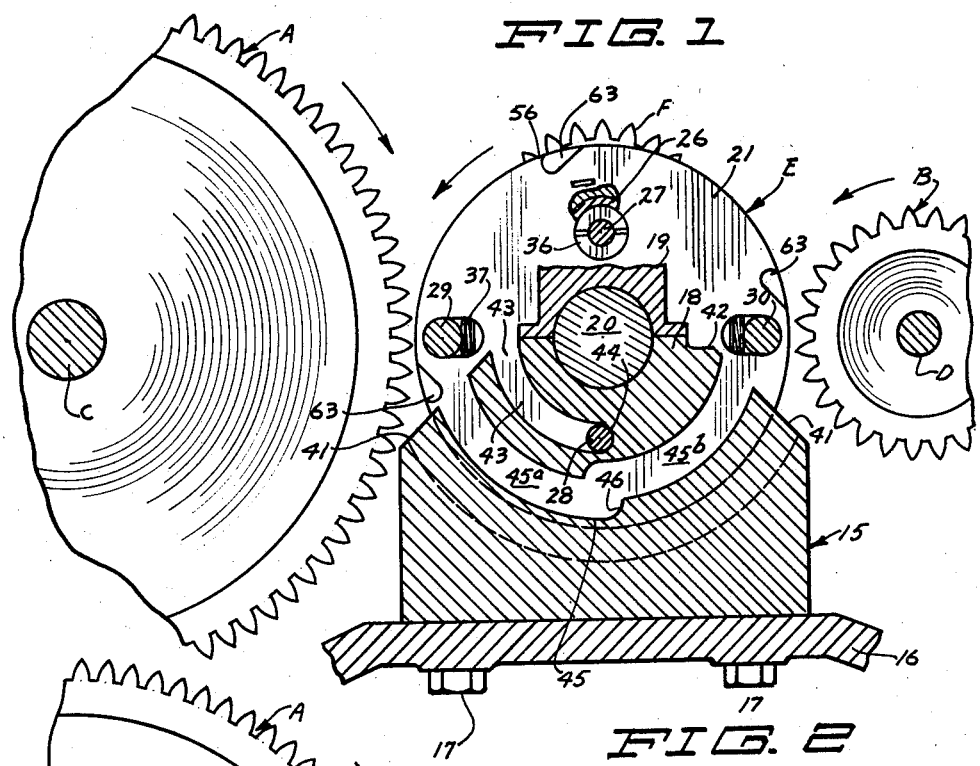
Fig. 1 is a transverse sectional view through the driving and driven shafts of a transmission showing adjacent portions a pair of the cluster gears thereon and illustrating the arrangement between such gears of a speed changing unit according to my invention, with the base portion thereof shown in section and the gears out of mesh.

Referring now more particularly and by reference characters to the drawing a basic speed changing unit will first be described and it is to be understood that the same is associated with driving and driven gear clusters A and B mounted upon parallel driving and driven shafts C and D, as seen in Fig. 7, such clusters having gears of varying pitch diameters so that when any opposed pair of such gears are brought into driving relationship the speed of the driven shaft D will be varied with respect to that of the driving shaft C. To accomplish such connection between the respective gears of the clusters A and B I provide a number of speed changing units, designated generally at E, which are located one between each corresponding or mating pair of gears of the respective clusters, and each of such units comprises a pair of meshing gears F and G which normally stand in positions out of mesh with the cluster gears but which are selectively moved into mesh with the driving and driven gears to transmit torque from the shaft C to the shaft D. In the ordinary transmission the gears of the gear clusters are brought into mesh by sliding one with respect to the other so that clutching and declutching is necessary in shifting speeds, but according to my invention the intermediate gears F and G are rolled into and out of mesh with the gear clusters in such fashion that it is not necessary to declutch the engine connected to the driving shaft C to effect the change in travel speed or operating speed of the driven mechanism connected to the shaft D. In Fig. 7

I show the shaft C as connected through a clutch H to the engine shaft I, to permit declutching when desired, and this clutch is preferably of a fluid type or equivalent to reduce impact on the parts of my transmission as speeds are changed.

Each of the units E comprises a stationary support in the form of a base member 15 which is here shown as secured to the bottom 16 of the ordinary transmission casing by means of suitable cap screws or studs 17, Fig. 1. For convenience in this description it will be assumed that the units E are arranged upon the base of the transmission casing although I do not, of course, restrict myself to this particular mounting arrangement. The base member 15 is provided with spaced apart bearings 18, having removable bearing caps 19, to rotatably receive trunnions 20 projecting in opposite directions from a circular gear carrier or member 21, the said base member being also cut away, as is designated at 23, to provide spaced apart upright sides 24 between which said carrier 21 is positioned. The carrier 21 is in turn recessed, as seen at 25 in Fig. 3, to provide clearance for the intermediate gears F and G so that they may run in mesh in a plane coinciding with the axes of the trunnions 20 and these gears are rotatably mounted upon bushings or bearings 26 mounted in the carrier and so locating the gears F and G that their peripheral portions (opposite those which mesh) project beyond the periphery of the carrier 21.

Figure 2:
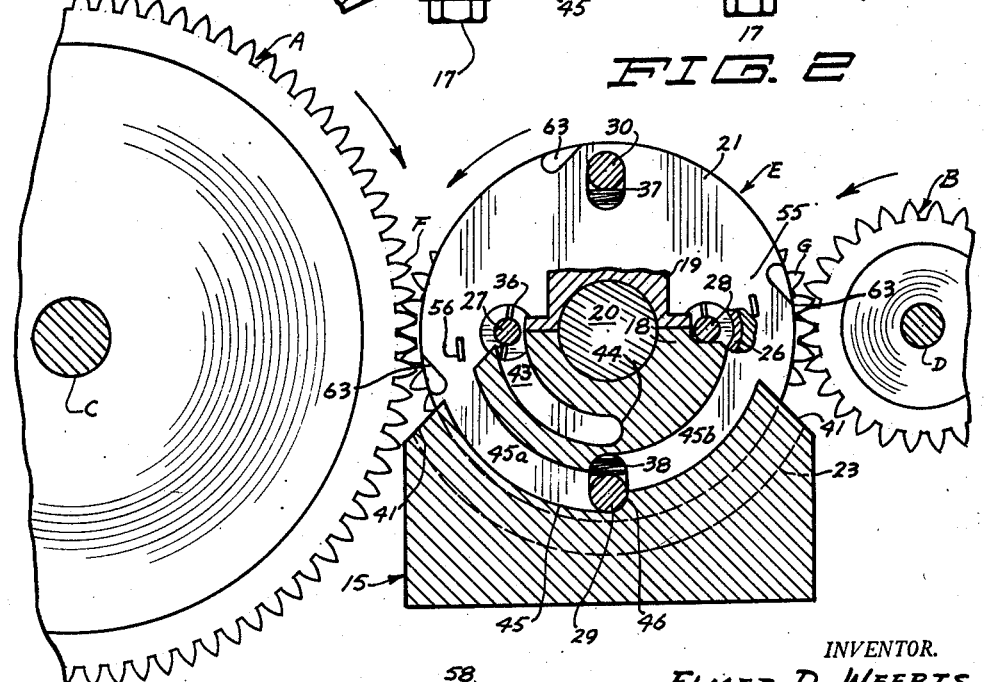
Fig. 2 is a similar view but illustrating the gears in the in mesh condition.

Normally the carrier 21 stands in the position illustrated in Figs. 1 and 3 with the gears F and G out of mesh with the gears of the clusters A and B, but upon rotation of the carrier in the direction of the arrow in Fig. 1 through a quarter turn the exposed teeth of the gears F and G will roll or in effect "climb" into mesh with the mating gears of the clusters A and B as is seen in Figs. 2 and 4. Were there no provision to prevent rotation of the carrier 21 more than a quarter turn at a time the gears F and G would then simply roll on out of mesh with the gears of the clusters A and B and it will be apparent, therefore, that this method of bringing the gears into mesh may not only be accomplished without any tendency of the gears to clash but, more important, also without making it necessary to halt the rotation of the gear cluster A by declutching it at H from its power source I, as is the case in present day transmissions. I find that this method of meshing the gears also is one which actually is automatic, once it has started, so that to this extent at least the operation of the transmission may be regarded as automatic except that the particular unit E to be brought into operation is selected manually and its initial motion is brought about manually as will later appear. It will be noted that the teeth of the gears of the clusters A and B, as well as of the intermediate gears F and G, are pointed and this configuration of the teeth assists in the meshing and unmeshing of the gears without in any way detracting from their ability to transmit torque while in mesh.

It will be readily understood from the foregoing that the movement of the gear carrier 21 must be limited to a quarter turn at a time to either mesh or unmesh the gears F and G with their respective driving and driven gears. For this purpose I provide the carrier with what I will refer to herein as out of mesh locking pins 27 and 28, located in diametrically opposed relationship with respect to the axes of the trunnions 20, and larger, in mesh locking pins 29 and 30 located intermediate the pins 27—28 and at distances greater than that of the pins 27—28 from said axes. The construction and arrangement of these pins will best be understood from a study of Figs. 8 and 9 and in Fig. 8 it will be seen that pins 27 and 28 are pointed at their opposite extremities 31 and are made up of telescopically assembled sections 32 and 33 normally urged apart by enclosed expansion coil springs 34 so that the pointed ends of the pins are biased outward from the opposite faces of the carrier 21. This outward motion of the parts is limited by snap rings 35 and for convenience in mounting the pins hollow screws 36 are threaded through from one side to the other of the carrier 21 within the aforesaid bushings 26 which mount the gears F and G.

On the other hand the pins 29—30 are mounted for radial movements in the carrier 21 in slots 37 provided therein and are biased outwardly to the outer ends of the slots by expansion coil springs 38 located in the inner ends of said slots as clearly shown. The ends of these pins 29—30 project at all times beyond the opposite faces of the carrier 21 and these exposed ends may if desired be provided with anti-friction rollers (not shown). Centrally each pin 29—30 is peripherally grooved at 39 and a stay pin 40 is threaded into the carrier tangentially to said groove to retain the pin against endwise displacement, this pin 40 passing within the coils of the spring 38 to also retain it in place.

The base member 15 is beveled off at its upper corners 41 adjacent the gear clusters A—B except adjacent the bearings 18 whereat horizontal shoulders 42 are formed. Grooves 43 lead from one of said shoulders 42 in the direction of movement of the carrier 21 to outward openings 44 located beneath the bearings 18 and acting as stops for the pins 27—28, said grooves being formed within the sides 24 of said base on axes centered on the axes of said bearings, being deep enough at the shoulders 42 to receive the pins. These grooves 43 are so spaced from the bearing axes that the out of mesh locking pins will enter the grooves as the carrier 21 moves from its in mesh positions, Figs. 2 and 4, toward its out of mesh positions, Figs. 1 and 3, and the grooves gradually become shallower toward the openings 44 to compress the pins 27—28 until as they reach the openings the pins will expand to lock the carrier against further motion, as seen in Fig. 1.

Grooves 45 are also formed in the inner surfaces of the sides 24 of the base member 15, outward radially from the grooves 43 and from one beveled edge 41 to the other, to pass the in mesh locking pins 29—30, but beneath the bearings 18 these grooves 45 have offsets forming stops 46. In other words, the first portions 45$^a$ of the grooves are formed on longer radii (with reference to the axes of the bearings 18) than the latter portions 45$^b$, speaking with regard to the direction of travel of the gear carrier 21.

It will now be understood that, assuming the unit to be in the out of mesh condition of Fig. 1, it may be moved to the in mesh condition of Fig. 2 by camming the pointed ends 31 of the pin 28 inward until the same will clear the opening 44 and move on to and expand just above the shoulder 42 nearest gear cluster B, at which point the in mesh locking pin 29 will come to rest against the stop 46 halting further motion of the carrier 21. The carrier member is thus locked against rotation in any direction. To then disengage the gears F and G from the driving and driven clusters A and B it is necessary to lift the in mesh locking pin 29, or move it inward against its spring 38 toward the axis of rotation of the carrier, until it clears the stops 46 at which time the carrier may make another quarter turn until its out of mesh locking pin 27 reaches the stop at opening 44, at which point the carrier is again locked. It will thus be seen that movement of the gears F and G into mesh requires the compression of the pin 27 (or 28) until it clears the openings 44 and the movement to out of mesh requires the lifting of the in mesh locking pin 29 (or 30) until it clears the stops 46. These pins are respectively operated by opposed upper cams 47 and lower cam hooks or pawls 48 provided on the inner sides of the legs 49—50 of a generally inverted U-shaped pin actuating and carrier controlling fork 51. This fork is operatively arranged for upward and downward movements by slidably positioning the legs in upright grooves 52 (Fig. 11) in the outer surfaces of the sides 24 of the base member 15, said grooves terminating short of the bottom of the base member and communicating with inset recesses 53 receiving the inwardly offset lower ends 54 of said legs 49—50. The cams 47 are so located that, as the fork 51 is raised, they will engage and cam the pointed ends 31 of the out of mesh locking pins 27 or 28 and by compressing the springs 34 telescope the pin sections 32—33 and so cause the pins to clear the openings 44 and permit the carrier 21 to turn to its in mesh condition. Of course, if one of these pins 27—28 is not in the openings 44 then one of the in mesh locking pins 29 and 30 will be resting against the stops 46 in which case the lower cam hooks 48 will engage the projecting ends of the pin and lift it clear of said stops 46 so that the carrier 21 may move on to its out of mesh condition. These hooks 48 are spring hinged at 48a to the legs 49—50 and normally stand inward therefrom but may be swung outward to clear the ends of pins 29—30 as will later appear.

Figure 2A:
Fig. 2A is a horizontal and enlarged sectional detail view taken along the line 2A—2A in Fig. 4.

Located on the opposite surfaces of the carrier 21 radially outward of and slightly in advance of the out of mesh locking pins 27—28 are cams 55—56 which, as the carrier turns, will travel through the grooves 45 clearing the cam hooks 48, and these cams 55—56 trip hinged and spring biased latches 57—58 provided on the upper portions of the legs 49—50 of the fork 51 for a purpose presently to appear. The latches, as see Fig. 2A, are pivoted on upright axes at 59 in openings 60 in said legs and normally project inwardly therefrom as shown.

In addition to the actuation of the locking pins 27, 28, 29 and 30 to control the quarter-turn movements of the carrier 21 of each speed changing unit E it is also necessary to provide means for turning the respective carriers a quarter turn until their gears F and G mesh with or disengage the gears of the driving and driven clusters A and B as the case may be. For this purpose I provide for each carrier 21 a shifter fork 61 having knobbed ends 62 for engaging any pair of a series of four angularly extending peripherally located notches 63 on each side of the carrier, as seen in Figs. 3 and 4. When this fork is thrust downward from the position of Fig. 3 to that of Fig. 4 it will move the carrier a quarter turn as is clearly shown, and on each up stroke it will move back into engagement with the next pair of such notches 63 ready for the next operation.

From the description thus far it will be apparent that in order to shift the intermediate gears F and G of the units E into and out of mesh with the corresponding gears of the driving and driven gear clusters A and B it is necessary to provide manually controlled means for properly operating the carrier control forks 51 and the carrier shifting forks 61. As an example of a suitable mechanism for this purpose, and which may be referred to hereinafter as the speed selector mechanism, I have illustrated a housing designated generally at 64 which is suitably supported some distance above the change speed gear assemblies and which includes a base 65 as well as front and rear walls 66 and 67 connected by a top 68, as is best seen in Figs. 3, 4 and 5. Each of the aforesaid carrier control forks 51 has its legs 49 and 50 secured at 51a to an operating rod 69 extending slidably upward through an opening 70 in the housing bottom 65. An expansion coil spring 71 is placed around the upper end portion of each of the control rods 69 and is braced between a washer 72 secured to the rod and the underside of the housing bottom 65 in order to bias the control rod and its associated fork 51 in a downward direction. At its upper end and within the housing 64 each control rod 69 is provided with vertically spaced apart and diametrically enlarged bearing flanges 73. Each carrier shifting fork 61 is joined by means of a flexible spring joint 74 of any suitable form to a push rod 75 telescoped into a hollow sleeve 76 which is slidably but non-rotatably mounted in an opening 77 in the housing bottom 65 and the upper end of said sleeve has diametrically enlarged vertically spaced bearing flanges 78. Coiled around each of these rods 75 is an expansion coil spring 79 braced between the lower end of the sleeve 76 and a flange 80 adjacent the aforesaid spring joint 74, the spring thus serving to normally project the rod 75 and its associated fork 61 in a downward direction or to effectively lengthen the telescoping assembly of the rod 75 and sleeve 76, so that in the normal or neutral position thereof (Fig. 3) the knobs 62 will rest in the uppermost pair of the aforesaid notches 63. To prevent the fork 61 from twisting out of place the rod 75 and sleeve 76 are both other than round in cross section, or are provided with suitable keys and keyways (not shown), and suitable means may be provided to limit expansion of the parts 75—76 beyond a given maximum effective aggregate length.

Positioned crosswise with respect to these rows of rods 69 and 75 and suitably journaled in bearings 81 on the ends 82 of the housing 64, as seen in Fig. 13, is a hollow sleeve 83 through which is slidably and relatively rotatably mounted a shaft 84 carrying at one end a gear shifting lever 85. The shaft 84 projects slidably and rotatably outwardly through a seal 86 (Fig. 13) in one end 82 of the housing 64 and the arrangement is such that the shaft may be moved endwise with respect to the sleeve 83 by shifting the lever 85 crosswise of the rows of operating rods and may also be rotated within the sleeve 83 by moving the lever forwardly and rearwardly or clockwise and counterclockwise as viewed in the drawings. In the showing of this mechanism in Figs. 3, 4 and 5 it will be assumed that the hand lever 85 is moved in a counterclockwise direction, in order to effect a change in gears, and is returned in a clockwise direction to its neutral position.

Rotatably mounted upon the sleeve 83 is a series of hubs 87, corresponding in number to the number of the actuating rods 65, and from these hubs there extend forked lever arms 88 the rounded bifurcations 89 of which are disposed at opposite sides of the upper ends of the respective rods 69 between the bearing flanges 73 thereupon. It will thus be seen that clockwise rotation of the hubs 87 upon the sleeve 83 will thrust the rods 69 and associated forks 61 in a downward direction, and vice-versa. Each of said hubs 87 further has an oppositely extending operating lug 90 and these lugs overlie the hooked end 91 of a series of bell crank levers 92 all of which are formed integrally, or otherwise connected to operate as a unit, and fulcrumed upon a shaft 93 extending through the housing ends 82, as clearly shown. The bell crank levers 92 curve upwardly and to the right, or rearwardly as seen in the drawings, and terminate in bifurcations 94 which fit between the flanges 78 on the sleeves 76. This construction is such that counterclockwise rotation of the hubs 87 will turn the bell cranks 92 in a clockwise direction so that their bifurcated ends 94 force the sleeves 76 downward tending to compress the springs 79 and move the forks 61 also in a downward direction. Return motion of the hubs 87 is caused to swing the bell cranks 92 upwardly again by the engagement of the extremities of the lugs 90 with a shoulder 95 formed adjacent the shaft 93, as is seen in Fig. 3, and by engagement of the ends 94 with the flanges 78 to raise the sleeves 76.

The sleeve 83 is formed with a longitudinally extending slot 96 extending substantially its full length (at least the full length of the assembly of the hubs 87) and opening through the end of the sleeve from which the shaft 84 projects. Each of the hubs 87 is provided with an inwardly extending lug 97 entering the upper portion of the slot 96 but not occupying the full width thereof as measured in a circumferential direction. The shaft 84 has an outwardly extending lug 98 the length of which is approximately the same as or less than the axial length of each of the hubs 87 and which lug may be brought into position beneath any of the lugs 97 by appropriately shifting the shaft 84 lengthwise. When the lugs 97 and 98 meet, as is seen in Fig. 3 for example, they together substantially fill the full width of the slot 96, again as measured circumferentially of the sleeve 83.

The operation of the mechanism will now be described and it will be understood that for any one of the units E the position of the parts, as illustrated in Fig. 3, is the out of mesh or neutral position. Assuming then that it is desired to shift this particular unit E into mesh the operator, by grasping the lever 85, moves the shaft 84 lengthwise until its lug 98 reaches a position beneath the lug 97 on the proper hub 87. There will, of course, be provided suitable indicia (not shown) associated with the lever 84 for indicating when it has reached the desired position for making the shift to any corresponding pair of the gears of the clusters A and B. With the shaft 84 thus positioned the hand lever 85 is then moved in a counterclockwise direction to the position of Fig. 4, during which operation the motion of the hub 87 where the lugs 97—98 are in registry will lift the actuating rod 69 and its associated carrier control fork 51 against the tension of the spring 71 causing the cams 47 upon the legs 49 and 50 of the fork to compress the sections 32 and 33 of the locking pins 27 or 28 of any carrier which is in the position of Fig. 1 and is to be shifted to the position of Fig. 2. This action releases the carrier 21 and immediately as this occurs the downward force upon the sleeve 76 which has been brought about by the same motion of the hub 87, acting on the bell crank levers 92, and which motion has heretofore only compressed the spring 79, will through the fork 61 and the notches 63 move the carrier 21 the quarter turn necessary to bring the intermediate gears F and G completely into mesh with the driving and driven gears as seen in Fig. 4. The purpose of the spring joint at 74 between the fork 61 and rod 75 is, of course, to permit the fork to swing in a lateral direction as necessary while it moves from its uppermost to its lowermost position, the fork being so illustrated in Fig. 4. It is to be noted that prior to the time that the carrier 21 is thus moved the full quarter turn, and until one of the in mesh locking pins 29 or 30 comes to rest against the stops 46, the intermediate gears F and G will come into mesh with the driving or driven gears but there will be no load on these intermediate gears until the carrier is locked and thus load forces are only transmitted when the gears are fully enmeshed. Since all of the bell crank levers 92 move as a unit it follows that all of the springs 79 will be compressed tending to move the carrier shifting forks 61 downwardly but, of course, only the carrier 21, which has been unlocked, will be moved through a quarter turn by the fork 61. If one of the units E has previously been in mesh it will be moved out of mesh, in advance of the time that the unit selected by the position of the shaft 84 and hand lever 85 is driven into mesh, for the reason that all of the actuating rods 69 are lifted to a point sufficient to raise an in mesh locking pin 29 or 30 clear of the stops 46 by the engagement of the lower edge of the slot 96 with the undersides of the inwardly projecting lugs 97 with which all of said hubs 87 are provided as seen in Fig. 5. Since any one of the units E which may happen to be in mesh will, of course, be locked by one of the in mesh locking pins 29 or 30 then this increment of upward movement of the actuating rods 69 and the associated forks 51 will be sufficient to cause the cam hooks 48 to lift the pin 29 or 30, as the case may be, clear of the stops 46 so that the associated fork 61 will move this particular unit to the out of mesh position, as will be readily understood.

It will be understood, from a study of Fig. 6, that the upward increment of movement of the carrier control forks 51 by the hubs 87 to the intermediate positions of Fig. 5, i. e., where the hubs are not moved by the lug 98 on shaft 84, will be sufficient to lift any one of the in mesh locking pins 29 or 30 which may be against the stops 46 but will not be sufficient to cause the cams 47 to release the out of mesh locking pins 27 or 28 from their stops 44. Thus the carrier 21 of only a unit E which is in mesh will be released and this will occur just in advance of the release of the carrier of the unit which has been selected by positioning the lever 85 and shaft 84 so that previously meshed gears will roll out of mesh just as selected gears roll into mesh. Again there can be no clashing of gears and there is no necessity for operating the clutch H to halt the tractor.

In the normal down positions of the forks 51 the aforesaid spring biased latches 57—58 are folded out flush with the legs 49—50 of the forks by contact with the sides of the bearing caps 19. When the forks 51 are fully raised, however, as has just been described these latches 57—58 will move up above the upper surface of the bearing caps 19 as seen in Fig. 4, whereupon the spring hinges 59 with which the latches are provided will swing the latches inwardly to overlie the upper edges of the caps. This action will retain the forks 51 in their elevated positions until one of the pins 29—30, or one of the cams 55 or 56, engages the latches and forces them outwardly so that they will clear the bearing caps and allow the forks 51 to return to their normal down positions, which they will do under the influence of the springs 71, to thus return the gear shift lever 85 to its neutral position as well as relieve the spring tension upon the forks 61. As the forks 51 are thus returned downwardly after the latches 57 and 58 are released the hinged hooks 48 will swing outwardly as they clear the ends of the pins 29 or 30, as the case may be, of any of the units E which is in meshed condition, and so the hooks will be ready to release the carrier upon the next full upward movement of the fork. The main purpose of the latches 57—58 is to be sure that the gear carriers move a full quarter turn into mesh before the spring tension on the forks 61 is relieved and is also to insure that the gear shift lever 85 will always be returned to its neutral position, ready for the next gear change. The cams 55—56 are arranged slightly in advance of the out of mesh locking pins 27—28 so that the cams will completely trip the latches 57—58 and so that they will also clear the cam hooks or pawls 48 when the forks 51 are raised.

While I have herein shown five of the units E in Fig. 7 I do not, of course, limit myself to such number and my invention lends itself to use in greater or fewer numbers, as well as in conjunction with an ordinary sliding gear transmission, according to circumstances.

Also, for tractors, the transmission lends itself to so-called "live-power" take-off shaft operation. For example the usual power take-off shaft (not here shown because it is so common) may be driven from the shaft I (Fig. 7) and should the operator desire to halt the forward travel of the tractor in any gear, without stopping this power take-off shaft, he may do so by moving the in gear unit E into the position of Figs. 1–3 to halt torque flow from shaft C to shaft D and thus stop the tractor. Then to restart the tractor he will merely reshift into this gear or select another gear according to conditions.

It is understood that suitable modifications may be made in the structure as disclosed, provided such modifications come within the spirit and scope of the appended claims. Having now therefore fully illustrated and described my invention, what I claim to be new and desire to protect by Letters Patent is:

I claim:

1. A change speed transmission of the character described including spaced apart driving and driven gears, a stationary base member and a gear carrier journaled thereon between but clearing said driving and driven gears, intermediate gears journaled in meshing relation upon said gear carrier and having their toothed peripheries projecting at diametrically opposed points beyond the carrier to mesh with the driving and driven gears and transmit torque therebetween, means for rotating the gear carrier substantially a quarter turn at a time to bring the intermediate gears into and out of mesh with the driving and driven gears, a pair of locking pins on the gear carrier and means on the base member cooperating with said pins to releasably lock the carrier in either of two positions with the intermediate gears out of mesh with the driving and driven gears, and another pair of locking pins and means on the base member cooperating with these pins to lock the carrier in either of two positions with the intermediate gears in mesh with the driving and driven gears.

2. In a change speed transmission including spaced apart driving and driven gears, a stationary base member between said gears and a gear carrier journaled on said base member clearing the gears, intermediate gears journaled in meshing relation upon said gear carrier and having their toothed peripheries projecting at diametrically opposed points beyond the carrier to mesh with the driving and driven gears and transmit torque therebetween, means for rotating the gear carrier substantially a quarter turn at a time to bring both the intermediate gears into and out of mesh with the driving and driven gears respectively, a first pair of diametrically opposed locking pins on the gear carrier and means on the base member cooperating with said pins to releasably lock the carrier in either of two positions with the intermediate gears completely out of mesh with the driving and driven gears, and a second pair of diametrically opposed locking pins intermediate the first pair and means on the base member cooperating with said second pair of pins to lock the carrier in either of two positions with the intermediate gears in mesh with the driving and driven gears.

3. A change speed transmission of the character described including spaced apart driving and driven gears, a stationary base member and a gear carrier journaled thereon between said driving and driven gears, intermediate gears journaled in meshing relation upon said gear carrier and operative to mesh with the driving and driven gears and transmit torque therebetween, means for rotating the gear carrier substantially a quarter turn at a time to bring the intermediate gears into and out of mesh with the driving and driven gears, a pair of out of mesh carrier locking pins on the gear carrier and the base member having grooves with end stops cooperating with these pins to releasably lock the carrier in either of two positions after a quarter turn and with the intermediate gears completely out of mesh with the driving and driven gears, and a pair of in mesh carrier locking pins and the base member having grooves with intermediate stops cooperating with these pins to lock the carrier in either of two positions with the intermediate gears in mesh with the driving and driven gears.

4. A change speed transmission of the character described including spaced apart driving and driven gears, a stationary base member and a gear carrier journaled thereon between said driving and driven gears, intermediate gears journaled in meshing relation upon said gear carrier and operative to mesh with the driving and driven gears and transmit torque therebetween, means for rotating the gear carrier substantially a quarter turn at a time to bring the intermediate gears into and out of mesh with the driving and driven gears, a pair of out of mesh carrier locking pins on the gear carrier and the base member having grooves with end stops cooperating with these pins to releasably lock the carrier in either of two positions after a quarter turn and with the intermediate gears completely out of mesh with the driving and driven gears, a pair of in mesh carrier locking pins and the base member having grooves with intermediate stops cooperating with these pins to lock the carrier in either of two positions with the intermediate gears in mesh with the driving and driven gears, and a manually operative carrier controlling element operatively engaging said pins to release the carrier from its locked positions.

5. A change speed transmission of the character described including spaced apart driving and driven gears, a stationary base member and a gear carrier journaled thereon between said driving and driven gears, intermediate gears journaled in meshing relation upon said gear carrier and operative to mesh with the driving and driven gears and transmit torque therebetween, means for rotating the gear carrier substantially a quarter turn at a time to bring the intermediate gears into and out of mesh with the driving and driven gears, a pair of out of mesh carrier locking pins on the gear carrier and the base member having grooves with end stops cooperating with these pins to releasably lock the carrier in either of two positions after a quarter turn and with the intermediate gears completely out of mesh with the driving and driven gears, a pair of in mesh carrier locking pins and the base member having grooves with intermediate stops cooperating with these pins to lock the carrier in either of two positions with the intermediate gears in mesh with the driving and driven gears, a manually operative carrier controlling element operatively engaging said pins to release the carrier from its locked positions, and manually operative means for turning the carrier a quarter turn when it is unlocked.

6. In a change speed transmission including spaced apart driving and driven gears, a stationary base member and a gear carrier journaled thereon between said driving and driven gears, intermediate gears journaled in meshing relation upon said gear carrier and operative to mesh with the driving and driven gears and transmit torque therebetween, means for rotating the gear carrier substantially a quarter turn at a time to sequentially bring the intermediate gears into and out of mesh with the driving and driven gears, a first pair of locking pins on the gear carrier and means on the base member cooperating with said pins to releasably lock the carrier in either of two positions with the intermediate gears out of mesh with the driving and driven gears, a second pair of locking pins and means on the base member cooperating with these pins to lock the carrier in either of two positions with the intermediate gears in mesh with the driving and driven gears, the gear carrier having notches, a speed selector mechanism including a spring mounted fork having ends for engaging said notches, a pin actuating and gear carrier controlling fork having cam elements for unlocking the said locking pins, and gear shift lever controlled means for sequentially actuating the respective forks to first unlock the gear carrier and then move the same through a quarter turn at a time and thereby enmesh and unmesh the intermediate gears and the driving and driven gears.

7. A change speed transmission including spaced apart driving and driven gear clusters having series of matching but non-meshing driving and driven gears, a stationary base member and a gear carrier journaled thereon between said driving and driven gears, intermediate gears journaled in meshing relation upon said gear carrier and operative to mesh with the driving and driven gears and transmit torque therebetween, means for rotating the gear carrier substantially a quarter turn at a time to bring the intermediate gears into and out of mesh with the driving and driven gears, a pair of locking pins on the gear carrier and means on the base member cooperating with said pins to releasably lock the carrier in either of two positions with the intermediate gears out of mesh with the driving and driven gears, another pair of locking pins and means on the base member cooperating with these pins to lock the carrier in either of two positions with the intermediate gears in mesh with the driving and driven gears, the gear carrier having notches, a speed selector mechanism including a spring mounted fork having ends for engaging said notches, a pin actuating and gear carrier controlling fork having cam elements for unlocking the said locking pins, means for sequentially actuating the respective forks to first unlock the gear carrier and then move the same through a quarter turn at a time and thereby enmesh and unmesh the intermediate gears and the driving and driven gears, there being a separate set of said carriers, intermediate gears and forks for each driving and driven gear of the gear clusters, and gear shift lever controlled means for selectively actuating the forks to move any selected intermediate gears into mesh with any selected gears of the gear clusters.

References Cited in the file of this patent

UNITED STATES PATENTS 2,108,586    Hutchings _____ Feb. 15, 1938